United States Patent
Braley et al.

(10) Patent No.: US 11,179,797 B2
(45) Date of Patent: Nov. 23, 2021

(54) ARTICLE COMPRISING ADDITIVELY MANUFACTURED METAL PORTIONS

(71) Applicant: The Boeing Company, Chicago, IL (US)

(72) Inventors: Daniel J. Braley, St. Peters, MO (US); Brandon Heath Wegge, Brentwood, MO (US); Elaine MacDonald, Wildwood, MO (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/845,875

(22) Filed: Apr. 10, 2020

(65) Prior Publication Data

US 2021/0316387 A1    Oct. 14, 2021

(51) Int. Cl.
*B23K 11/087* (2006.01)
*B64F 5/00* (2017.01)
*B33Y 80/00* (2015.01)

(52) U.S. Cl.
CPC ............ *B23K 11/0873* (2013.01); *B64F 5/00* (2013.01); *B33Y 80/00* (2014.12)

(58) Field of Classification Search
CPC combination set(s) only.
See application file for complete search history.

(56) References Cited

U.S. PATENT DOCUMENTS

| 4,436,988 | A |   | 3/1984 | Blumenkranz |   |
|---|---|---|---|---|---|
| 10,518,490 | B2 | * | 12/2019 | Wicker | B29C 70/885 |
| 10,542,589 | B2 | * | 1/2020 | Rios | B22F 10/20 |
| 2014/0268604 | A1 | * | 9/2014 | Wicker | B29C 70/885 |
|   |   |   |   |   | 361/760 |
| 2015/0108687 | A1 | * | 4/2015 | Snyder | B29C 64/321 |
|   |   |   |   |   | 264/308 |
| 2018/0027616 | A1 | * | 1/2018 | Rios | B33Y 30/00 |
|   |   |   |   |   | 219/603 |
| 2020/0063578 | A1 |   | 2/2020 | Notarnicola et al. |   |

FOREIGN PATENT DOCUMENTS

| CA | 3065462 A1 | 3/2020 |
|---|---|---|
| EP | 3326816 A1 | 5/2018 |
| FR | 2743525 A1 | 7/1997 |

OTHER PUBLICATIONS

DeLalio, J "How to Weld 3D Printed Parts," Fabricating & Metalworking, available online at https://www.fabricatingandmetalworking.com/2016/08/weld-3d-printed-parts/, Aug. 26, 2016, 3 pages.
European Patent Office, Extended European Search Report Issued in Application No. 21156232.7, dated Aug. 26, 2021, Germany, 5 pages.

* cited by examiner

*Primary Examiner* — Lawrence Averick
(74) *Attorney, Agent, or Firm* — Alleman Hall Creasman & Tuttle LLP

(57) ABSTRACT

An article comprising additively manufactured metal portions is described. The article comprises a first additively manufactured metal portion, and a second additively manufactured metal portion coupled to the first additively manufactured metal portion at a welded joint. The article further comprises a resistive heating material disposed within an interior of the welded joint, the resistive heating material comprising a different material than the first additively manufactured metal portion and the second additively manufactured metal portion.

7 Claims, 13 Drawing Sheets

ARTICLE COMPRISING ADDITIVELY MANUFACTURED METAL PORTIONS

FIELD

This disclosure relates to additive manufacturing, and more particularly to forming a structure by joining together additively manufactured portions of the structure.

BACKGROUND

An aircraft includes a wide variety of components, many of which have large sizes. For example, a duct configured to deliver pressurized air to an aircraft cabin can have a length greater than 50, 75, or even 100 feet, depending upon the aircraft.

Various techniques can be used to manufacture large parts for an aircraft. For example, a duct can be formed from sheet metal, e.g. using various cutting and bending steps. However, this approach can be relatively expensive and complex. Further, the material composition of the part can pose additional difficulties. For example, titanium-based metals are sometimes used to form aircraft parts for operation at high temperatures (e.g., 300-400° F.) and/or high pressures (e.g., 300-400 psi). However, titanium-based materials can difficult and time-consuming to machine. In addition, dies suitable for forming titanium-based parts can be costly and difficult to procure, as a die of comparatively greater hardness can be required to properly machine titanium-based materials.

Additive manufacturing techniques can also be used to form parts. Additive manufacturing involves the formation of three-dimensional parts layer-by-layer. Additive manufacturing has gained popularity due to its ability to form parts with complex geometries using a variety of materials, with reduced cost and manufacture time compared to other manufacturing techniques, such as machining.

While additive manufacturing has been implemented across a range of scales, current machines place an upper limit on the size of parts those machines can be used to manufacture. For example, the desired size of some large-scale parts, such as the large-scale aircraft duct mentioned above, exceeds the available volume of additive manufacturing machines in which parts can be built. Moreover, the cost required to operate large-scale additive manufacturing machines can obviate the cost savings otherwise achieved by additively manufacturing parts. Cost savings and manufacturing efficiency are further reduced where additively manufactured parts are post-processed.

Thus, and in view of the above, challenges exist in manufacturing large-scale aerospace components such as metal aircraft parts.

SUMMARY

To address the above issues, according to one aspect of the present disclosure, an article is provided. In this aspect, the article comprises a first additively manufactured metal portion, and a second additively manufactured metal portion coupled to the first additively manufactured metal portion at a welded joint. The article further comprises a resistive heating material disposed within an interior of the welded joint, the resistive heating material comprising a different material than the first additively manufactured metal portion and the second additively manufactured metal portion.

Another aspect of the present disclosure relates to a vehicle. In this aspect, the vehicle comprises a metal component, the metal component comprising a first additively manufactured metal portion, and a second additively manufactured metal portion coupled to the first additively manufactured metal portion at a welded joint. The metal component further comprises a resistive heating material disposed within an interior of the welded joint, the resistive heating material comprising a different material than the first additively manufactured metal portion and the second additively manufactured metal portion.

Yet another aspect of the present disclosure relates to a method of forming a metal article. The method comprises additively manufacturing a first portion of the metal article, additively manufacturing a second portion of the metal article, and placing the first portion of the metal article adjacent to the second portion of the metal article to locate a resistive heating material within an interface between the first portion of the metal article and the second portion of the metal article. In this aspect, the method further comprises directing electric current through the resistive heating material to produce heat via the resistive heating material, and welding the first portion of the metal article and the second portion of the metal article together via the heat produced via the resistive heating material.

The features, functions, and advantages that have been discussed can be achieved independently in various embodiments or may be combined in yet other embodiments, further details of which can be seen with reference to the following description and drawings.

DETAILED DESCRIPTION

In view of the considerations discussed above, examples are provided that relate to additively manufacturing metal portions and joining the portions to thereby form a metal article. Briefly, a first metal portion and a second metal portion of the article are additively manufactured. In some examples, three or more portions can be additively manufactured. Then, the first portion and the second portion are placed adjacent to each other in a manner to position a resistive heating material within an interface between the portions. As described in more detail below, the resistive heating material can comprise a wire, a deposited layer, or other suitable structure. Next, the first and second portions are welded together via heat produced by directing electrical current through the resistive heating material, thereby joining the first and second portions. In some examples, additional portions can similarly be joined. The metal article thereby formed can be an aircraft component in some examples. The manufacture of a metal article from additively manufactured portions can reduce manufacturing time, cost, and complexity compared to other methods such as machining and casting, while enabling the formation of articles with complex geometries and without requiring the use of large-scale additive manufacturing machines. In addition, this approach can support on-demand manufacturing of parts, reducing inventory and warehousing requirements.

Figure 1:
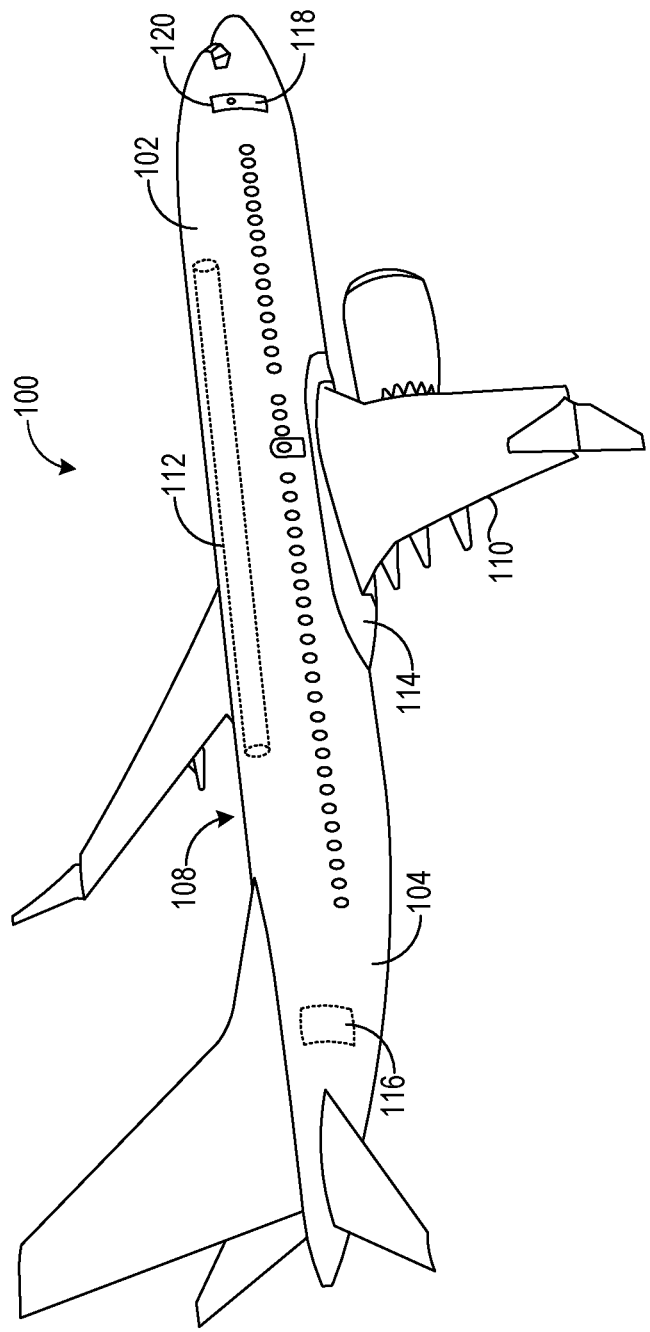
FIG. 1 shows an illustration depicting an example aircraft according to an example embodiment of the present disclosure.

FIG. 1 illustrates an example vehicle 100 in the form of an aircraft 102. Aircraft 102 includes a fuselage 108 and a wing 110 extending from the fuselage 108. Both fuselage 108 and wing 110 are fabricated by attaching a skin 104 to an underlying airframe (not shown). Aircraft 102 further includes a duct 112 disposed within fuselage 108 and in most cases, attached to the airframe. Duct 112 can be configured for any suitable purpose, including but not limited to delivering pressurized air to a cabin of aircraft 102. Certain components of skin 104, the airframe, fuselage 108, wing 110, and duct 112 can be additively manufactured via joined portions as disclosed here. Other example components are fairings, such as a wing root fairing 114 or a wheel fairing, and a panel, such as a panel of aforementioned skin 104 and an access panel 118 that forms a portion of a door 120. The approaches described herein are not limited to aircraft, and can be used to manufacture components for any suitable application, including for spacecraft and other aerospace vehicles.

Figure 2A:
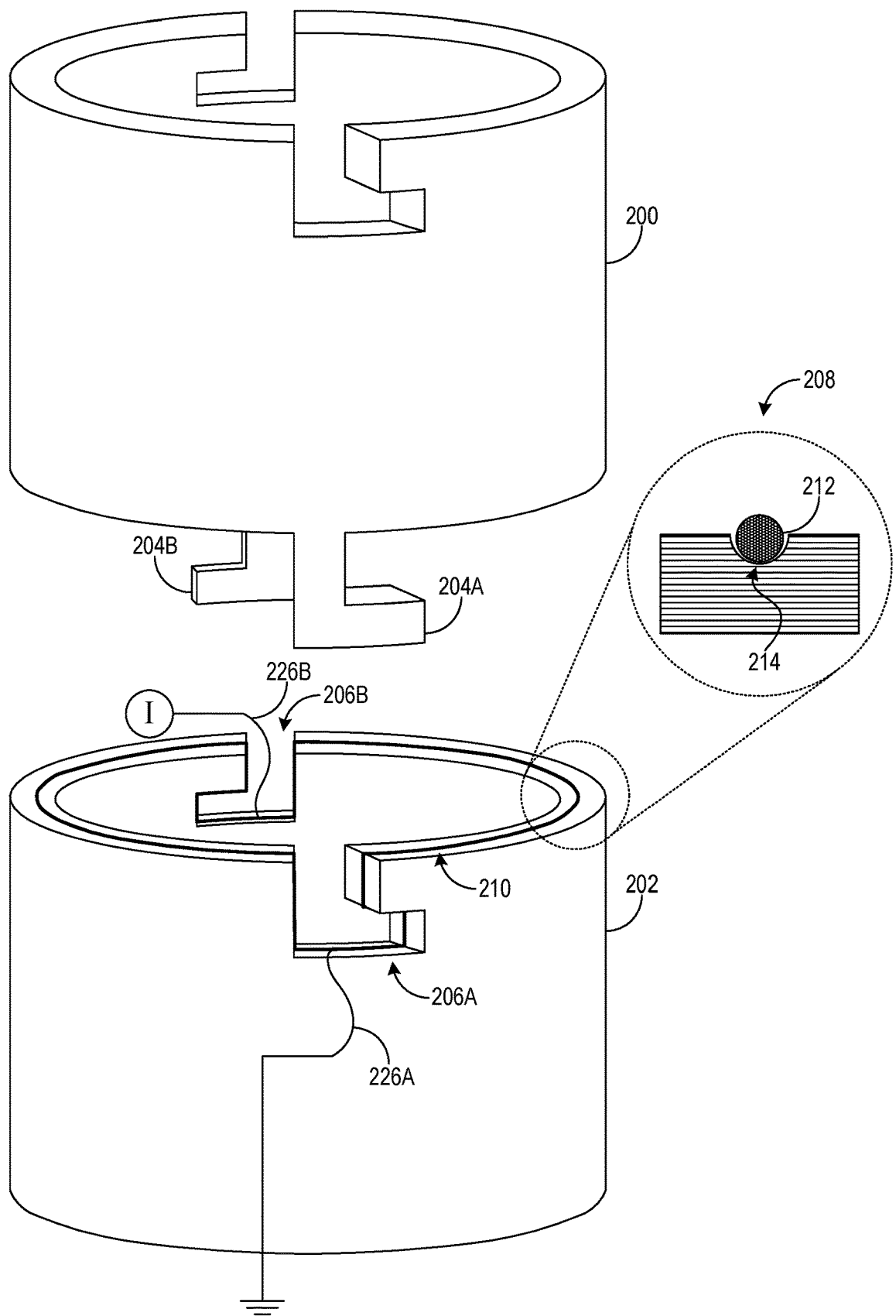
FIGS. 2A-2C show illustrations depicting the formation of an example metal article from additively manufactured metal portions.
Figure 2B:
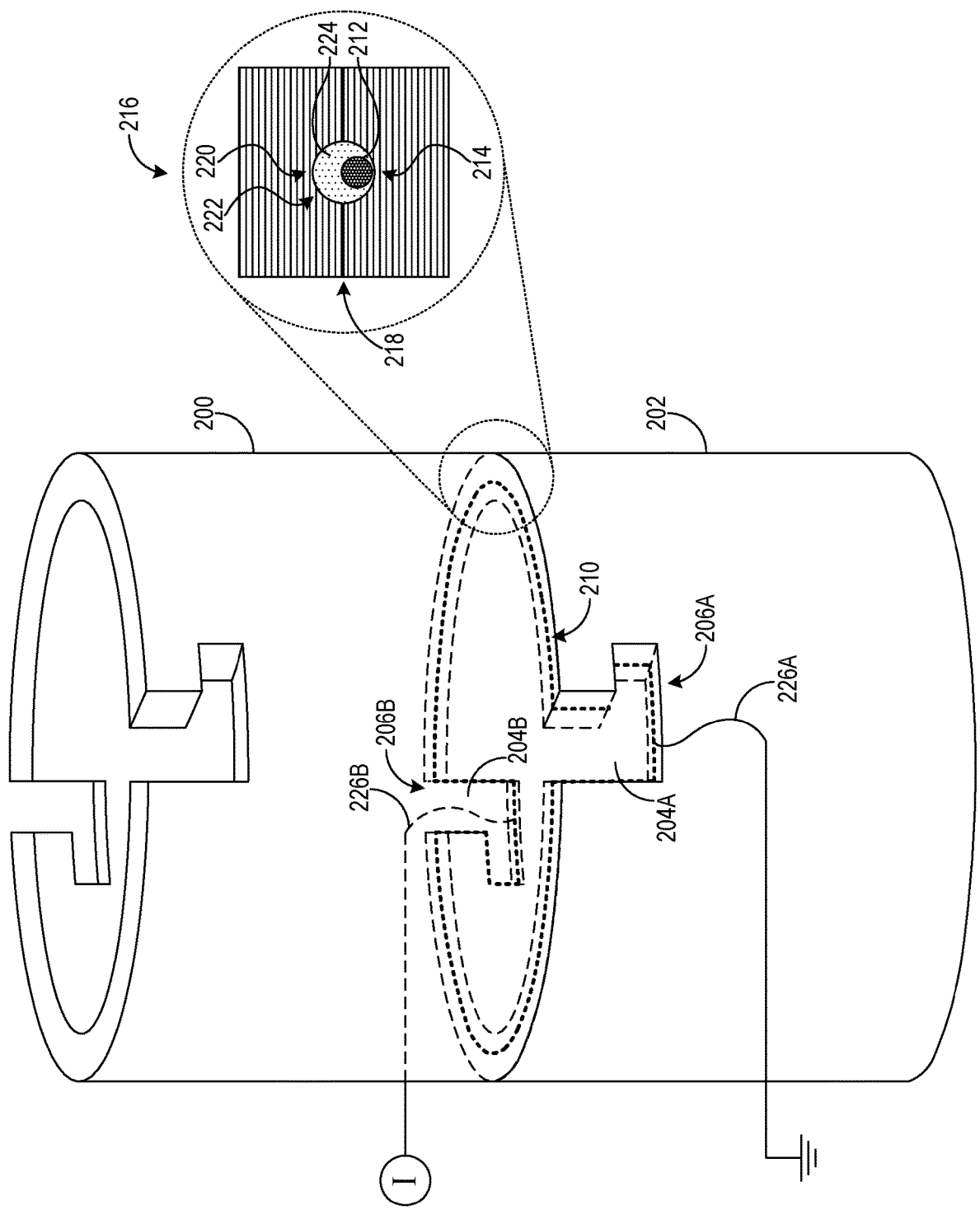
Figure 2C:
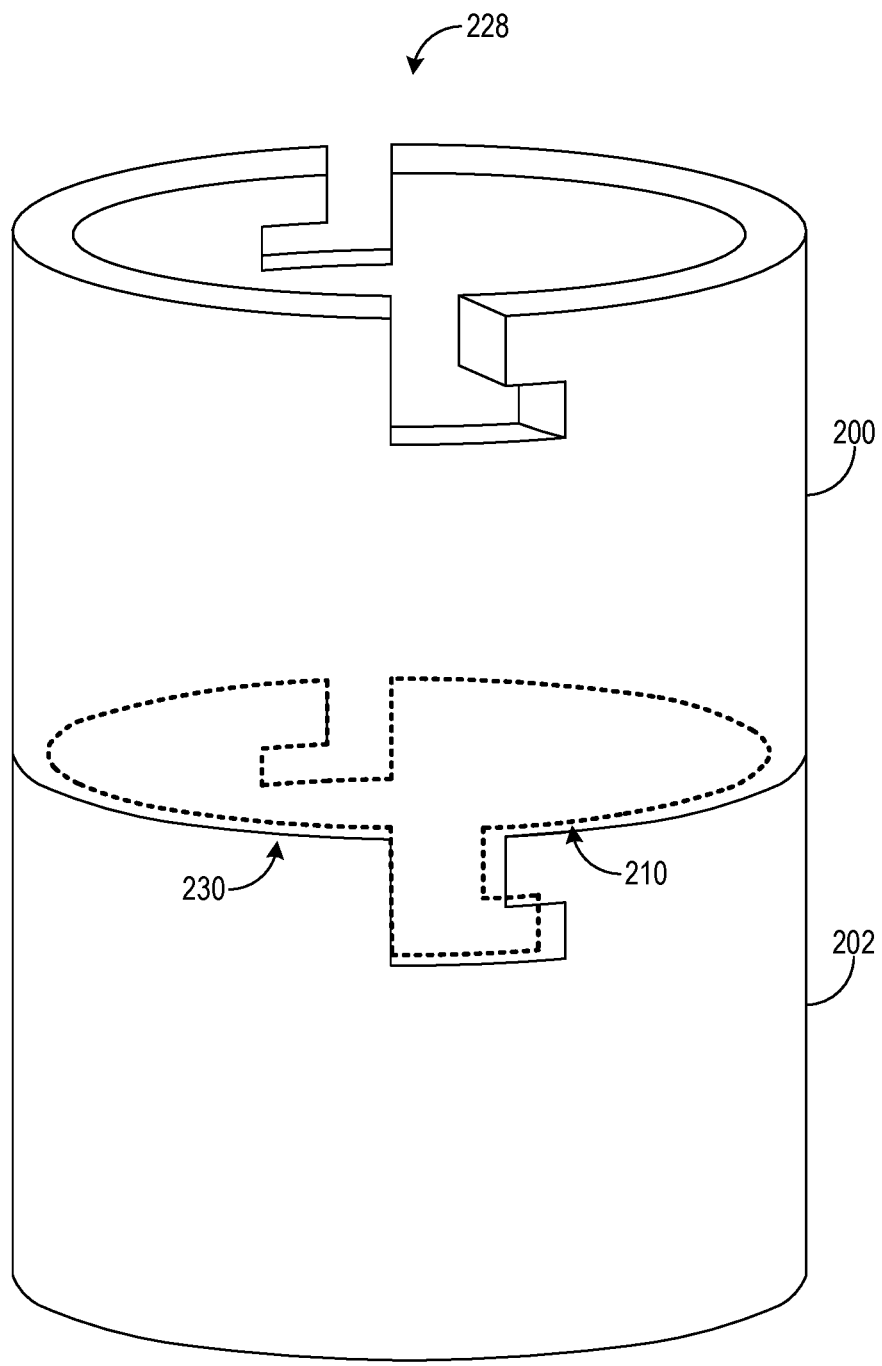

FIGS. 2A-2C illustrate the formation of a metal article from additively manufactured portions joined via resistive welding. The metal article is formed from a first metal portion 200 and a second metal portion 202, each of which is additively manufactured. As shown in FIG. 2A, first portion 200 comprises male connectors 204A and 204B, which are configured to couple to female connectors 206A and 206B of second portion 202, respectively. At 208, FIG. 2A shows a partial cross-sectional view of second portion 202, and illustrates a resistive heating material 210 in the form of a wire 212 disposed along a channel 214 formed within second portion 202. Wire 212 can be placed manually into the channel 214, or via a suitable automated process. In other examples, instead of a wire, resistive heating material 210 can take the form of a film or layer (e.g. as deposited by additive manufacturing of a different material onto first portion 200 and/or second portion 202), or any other suitable form.

Channel 214 can be formed in any suitable manner. In some examples, channel 214 is formed during the additive manufacture of second portion 202. In other examples, channel 214 is formed in a separate step (e.g., a machining step) after forming the second portion 202. In some examples both portions being joined can have channels to accommodate a resistive heating material, while in other example a channel can be formed in one of the two portions being joined.

FIG. 2B illustrates first and second portions 200 and 202 joined via male and female connectors 204 and 206. Male and female connectors 204 and 206 can provide a mechanism by which movement of first and second portions 200 and 202 relative to one another is constrained during welding. As depicted, male and female connectors 204 and 206 can have complementary geometries. At 216, FIG. 2B further shows a partial cross-sectional view of an interface 218 between first and second portions 200 and 202 formed by placing the portions 200 and 202 adjacent to (e.g., in contact with) each other. In this example, each of first and second portion 200 and 202 comprises a respective channel: the first portion 200 comprises channel 214, and the second portion 202 comprises a channel 220. With first and second portions 200 and 202 placed adjacent to each other, channels 214 and 220 create a void 222, which in this example is partially filled by wire 212. Accordingly, a filler material 224 can be disposed in along at least a portion of channel 220 to substantially fill void 222. In other examples, filler material 224 can be omitted, for example, where wire 212 or other resistive heating material substantially fills any channel or other gap between first and second portions 200 and 202. Filler material 224 can comprise any suitable material composition. In some examples, filler material 224 and portions 200 202 have a common material composition. In various examples, filler material 224 can be disposed in void 222 in a powder form, or as a composition comprising a paste or other viscous form. Further, filler material 224 can be configured as a flux material to assist the welding of first and second portions 200 and 202. Filler material 224 can be disposed in void 222 in any suitable manner.

As noted above, first and second portions 200 and 202 are welded together via heat produced by directing electrical current through resistive heating material 210. Any suitable current source can be coupled to resistive heating material 210 to deliver current thereto. As one example, FIG. 2A schematically depicts leads 226A and 226B each coupled at one end to resistive heating material 210, where the opposite ends of the leads 226A and 226B can be coupled to respective terminals of a current source I, which may represent any suitable direct current (DC) or alternating current (AC) current source.

FIG. 2C shows an article 228 formed by welding first and second portions 200 and 202 together. The welding of first and second portions 200 and 202 creates a welded joint 230 in article 228. As the welding process is performed with resistive heating material 210 between first and second portions 200 and 202, resistive heating material 210 remains disposed within an interior of welded joint 230 after welding is completed. The welding joins the first and second portions 200 and 202, and in some examples can weld resistive heating material 210 to first and second portions 200 and 202. As such, welded joint 230 refers to the welded material of first and second portions 200 and 202, as well as resistive heating material 210 located within the joint.

Article 228 schematically represents a portion of duct 112. However, any suitable type of article can be formed according to the approaches described herein, including but not limited to fairings, panels, and other aircraft and aerospace components. Further, as mentioned above, some articles can be formed from three or more separate additively manufactured portions. In this manner, articles of scalable size, dimensions, and geometry can be formed. Further, as additive manufacturing can be used to form components of complex shape without the use of part-specific tooling, each additively manufactured portion of a larger article can have a different configuration than the others, thereby allowing the just-in-time manufacturing of complex parts that, as a whole, are too large to additively manufacture and that are complex and/or expensive to form by machining, casting, or other methods.

The material composition of resistive heating material 210 can be selected such that the melting point of the heating material 210 is suitably higher than those of the first and second portions 200 and 202. As examples, resistive heating material 210 can comprise copper, silver, gold, titanium, steel, aluminum, nickel/chromium alloys (which can contain other metals as well) such as INCONEL alloys (available from Special Metals Corporation of New Hartford, N.Y.), and tin, as well as refractory metals such as tungsten, tantalum, molybdenum, rhenium, and niobium, depending upon the metal(s) of the portions being welded together. Examples of suitable metals for first and second portions 200 and 202 include steel and steel alloys, aluminum and aluminum alloys, titanium and titanium alloys (e.g. Ti-6Al-4V, as one particular example), cobalt and cobalt alloys, nickel and nickel alloys, iron and iron alloys, bronze and bronze alloys, niobium and niobium alloys.

Figure 3:
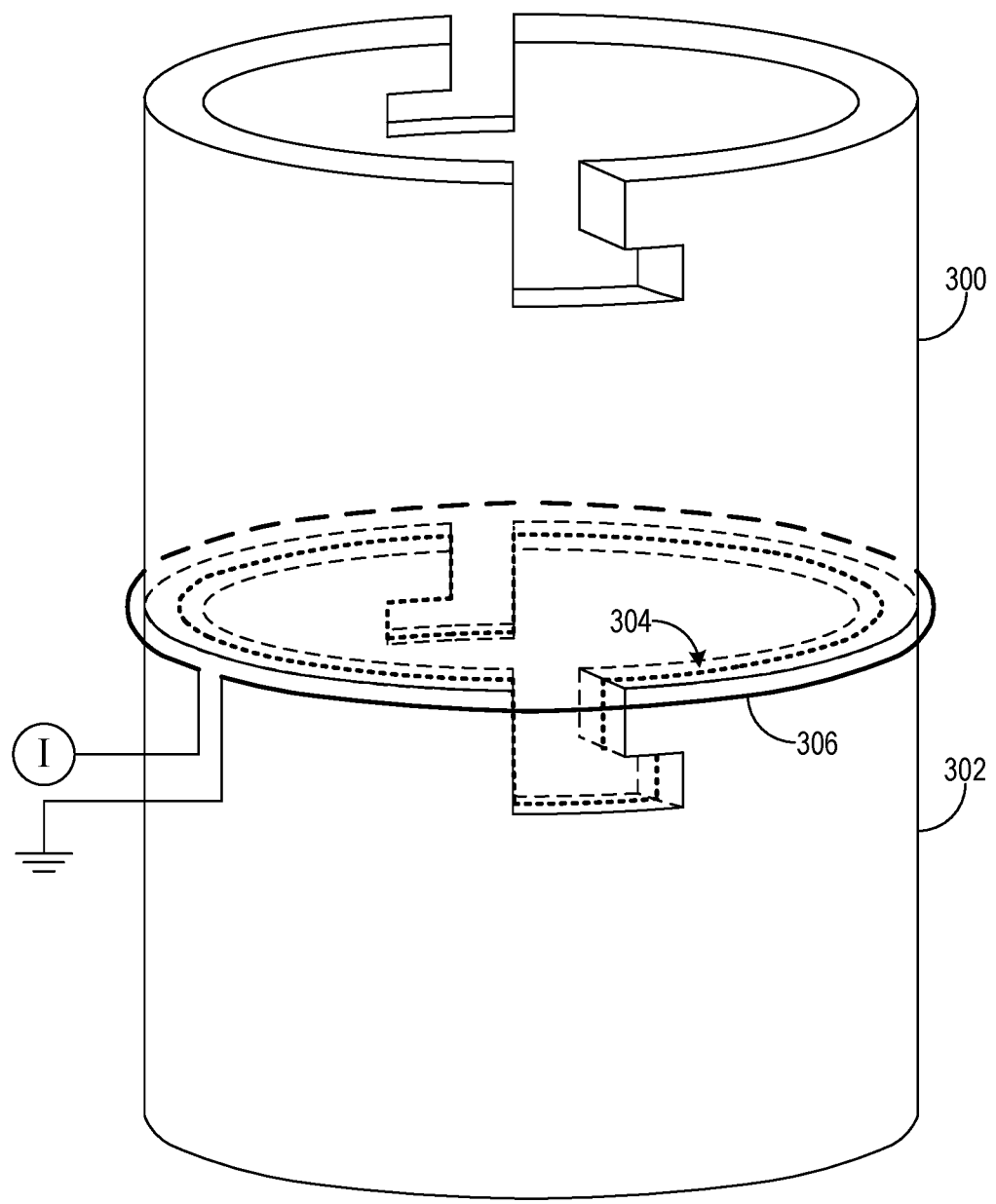
FIG. 3 shows an illustration depicting the formation of an example conductive metal article via inductive heating.

In some examples, electrical current can be delivered for welding metal portions via leads, as depicted in FIGS. 2A-2B. In other examples, electrical current can be produced inductively to thereby weld metal portions via inductive heating. FIG. 3 illustrates one example of such an approach in which a first additively manufactured metal portion 300 and a second additively manufactured metal portion 302 are welded together via inductive heating. Current is induced in resistive heating material 304 by alternating current directed through a loop or coil conductor, schematically indicated at 306, arranged circumferentially around first and second portions 300 and 302.

Figure 4:
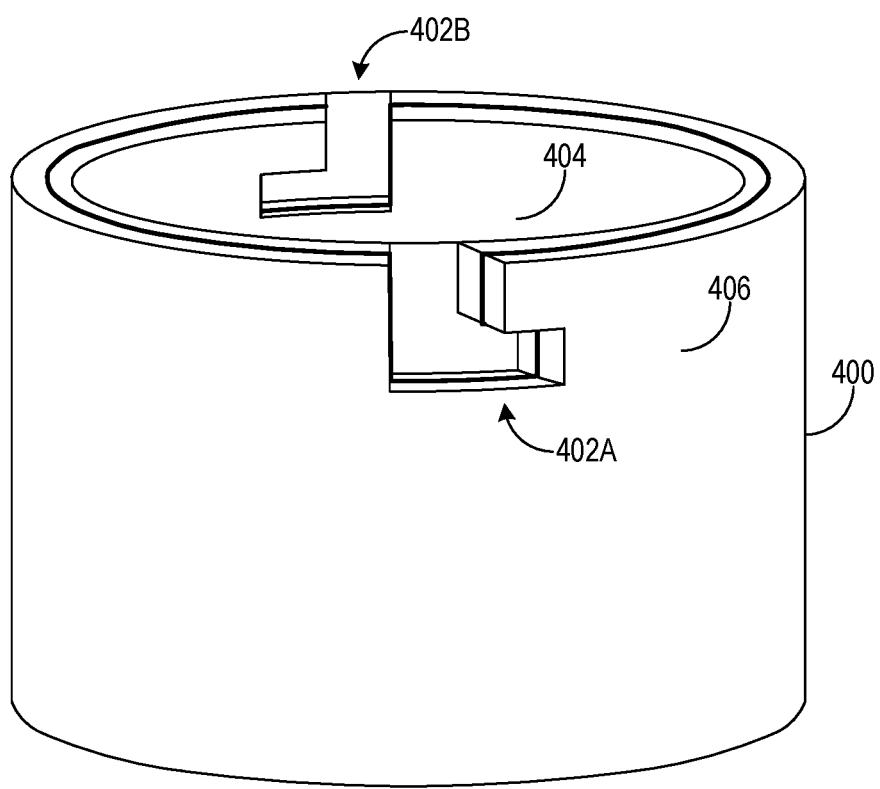
FIG. 4 shows an illustration depicting an example additively manufactured metal portion for incorporation into a larger article.

As mentioned above, additively manufactured portions to be joined by welding as disclosed can include features that help to hold the portions together during welding. The examples of FIGS. 2A-C and FIG. 3 utilize complementary connectors, wherein the female connectors comprise openings that extend through an entirety of a wall thickness of a metal portion and the male connectors have a thickness equal to the wall thickness. As another example, FIG. 4 depicts an additively manufactured metal portion 400 comprising female connectors 402A and 402B that extend partially through a wall of the portion 400. Corresponding male connectors (not shown) can have a complementary partial-thickness configuration. Further, in some examples, a subset of one or more connectors can have a partial thickness configuration, and another subset can have a full thickness configuration. For a partial thickness connector, whether to locate the opening for the connector on an outer or inner side of a wall can be based at least partially on which wall is a functional surface. As one example, metal portion 400 can form part of an article that conducts pressurized air through its interior. As such, an inner wall surface 404 can be continuous, and the opening for the connector can be formed in an outer wall surface 406 as a functional surface, as illustrated by female connectors 402.

Figure 5A:
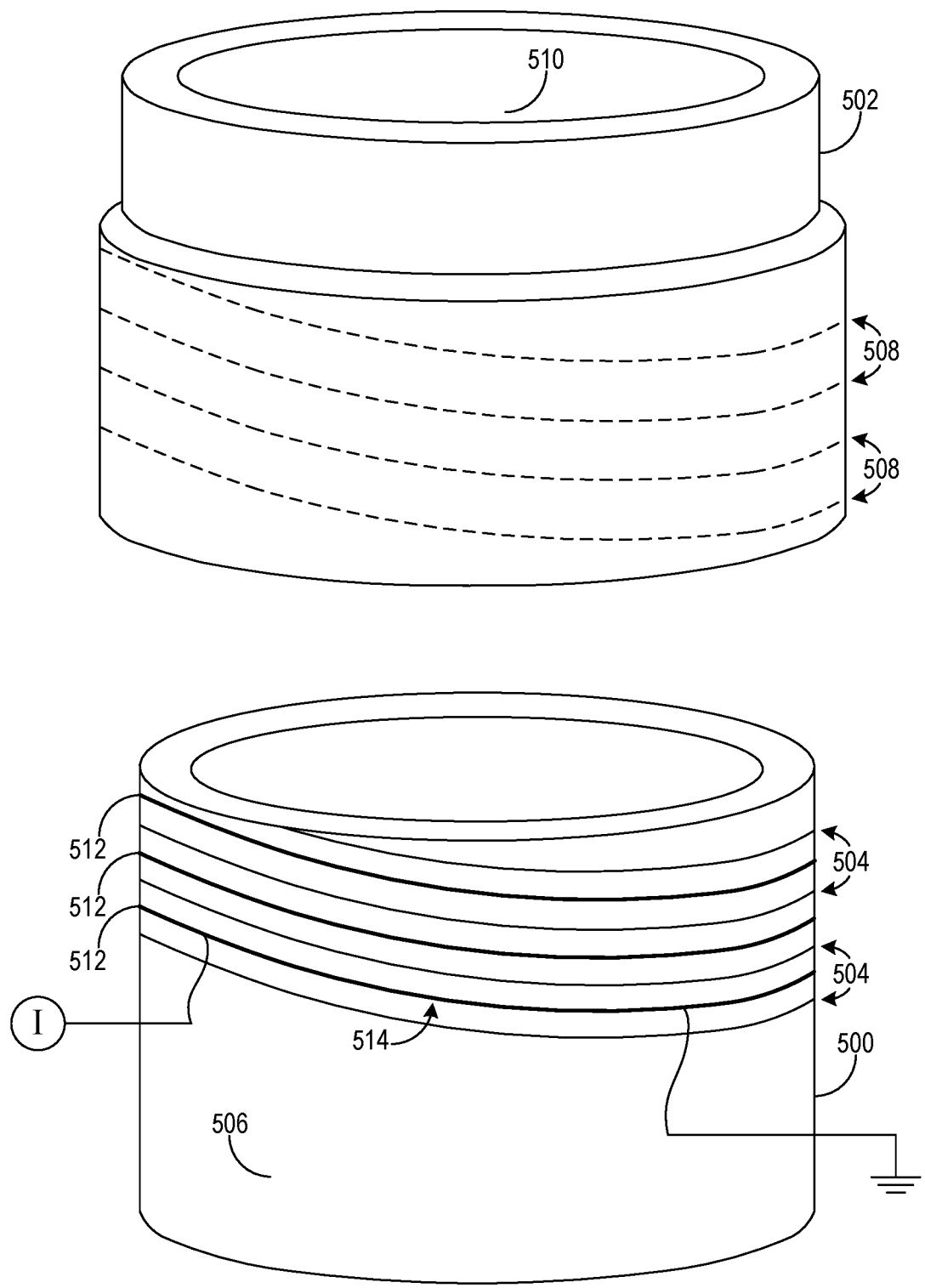
FIGS. 5A-5B show illustrations depicting the formation of another example metal article from additively manufactured metal portions.
Figure 5B:
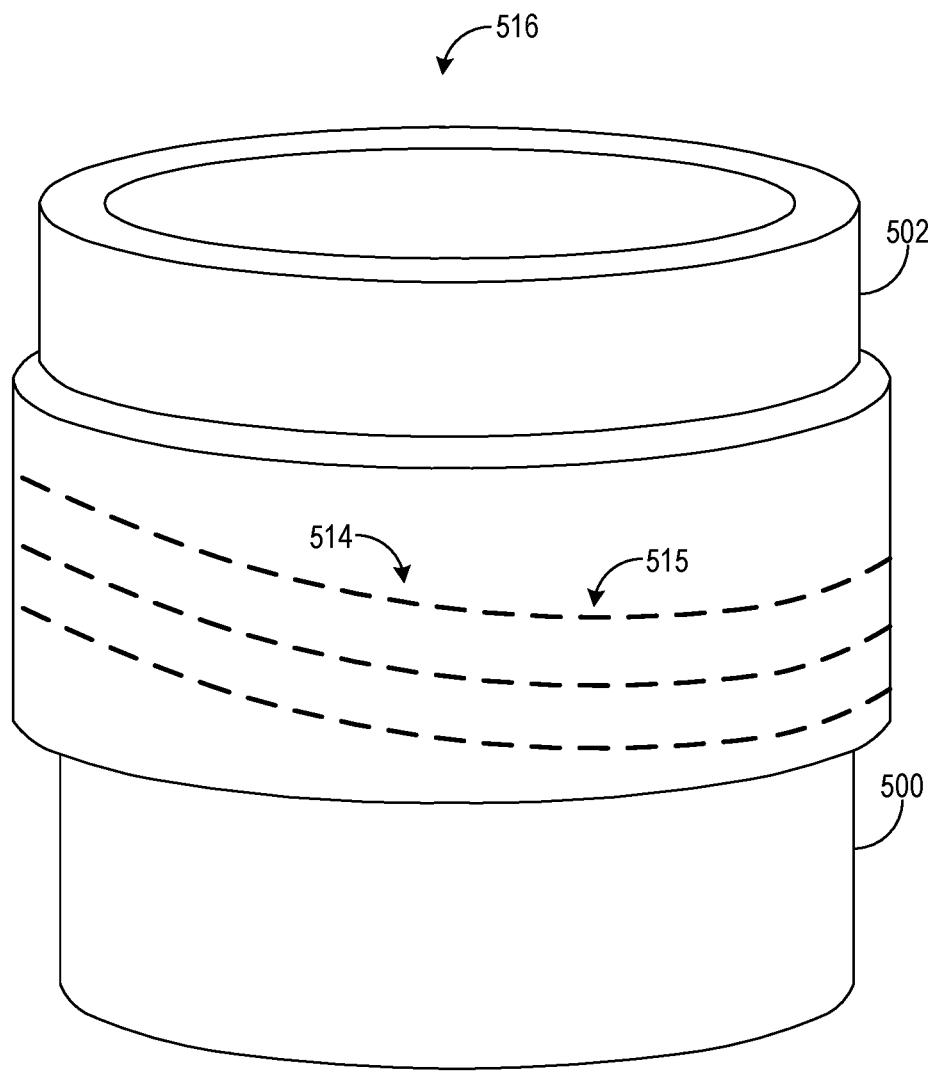

FIG. 5A depicts another example configuration for holding a first additively manufactured metal portion 500 and a second additively manufactured metal portion 502 during welding. In this example, each portion comprises complementary threads. In particular, first portion 500 includes threads 504 arranged on the surface of an outer wall 506 configured to engage with complementary threads 508 arranged on the surface of an inner wall 510 of second portion 502. First portion 500 further includes one or more channels 512 arranged on the surface of outer wall 506, where a resistive heating material 514 is disposed along at least a portion of the one or more channels 512. Channel(s) 512 are arranged between adjacent threads 504. In this arrangement, and with first portion 500 engaged with second portion 502 via threads 504, passing electrical current through resistive heating material 514 causes the formation of a welded joint 515 joining the first and second portions 500 and 502 to form a metal article 516, as shown in FIG. 5B. In other examples, resistive heating material 514 can be located within threads 504.

Figure 6A:
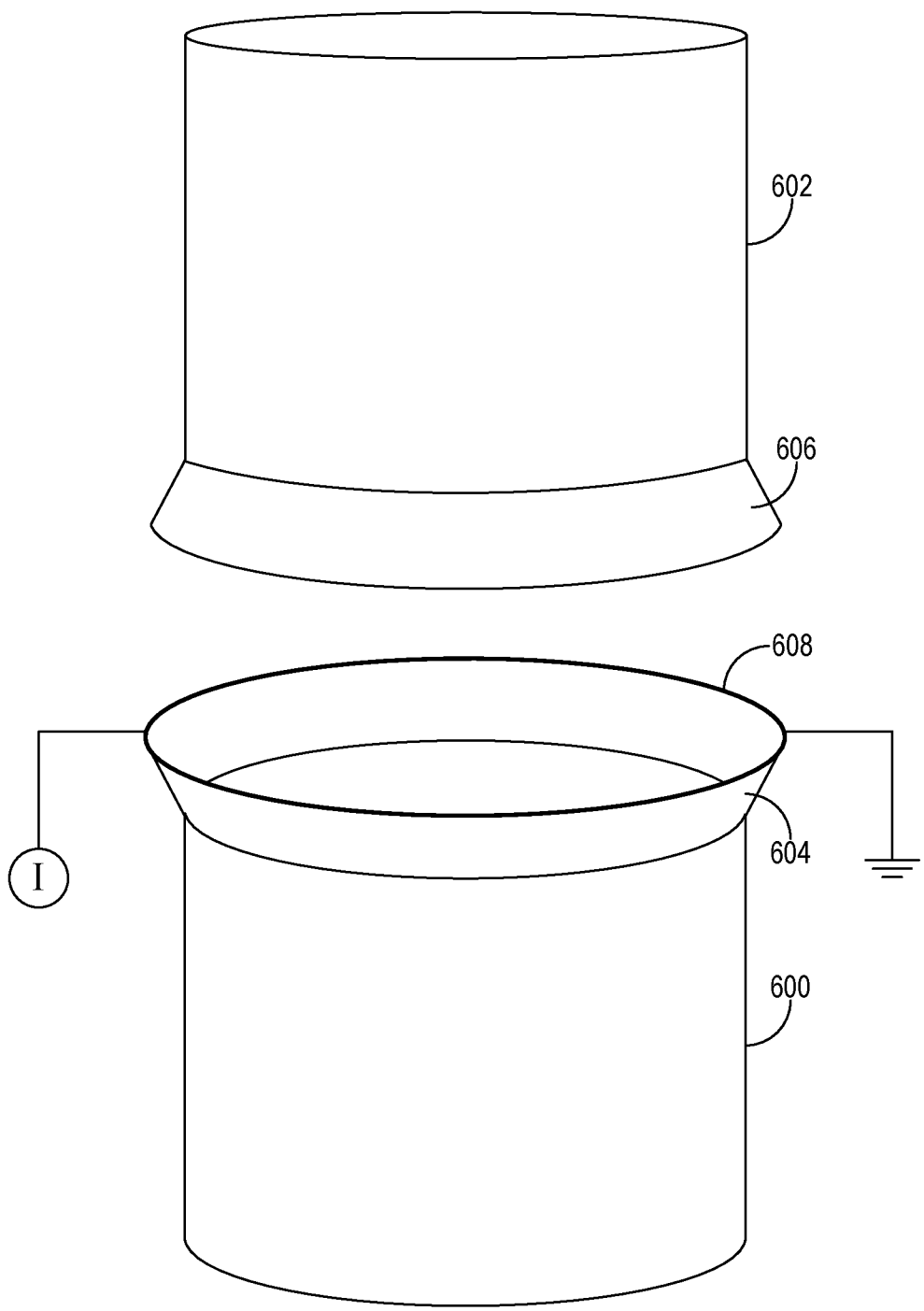
FIGS. 6A-6C show illustrations depicting the formation of another example metal article from additively manufactured metal portions.
Figure 6B:
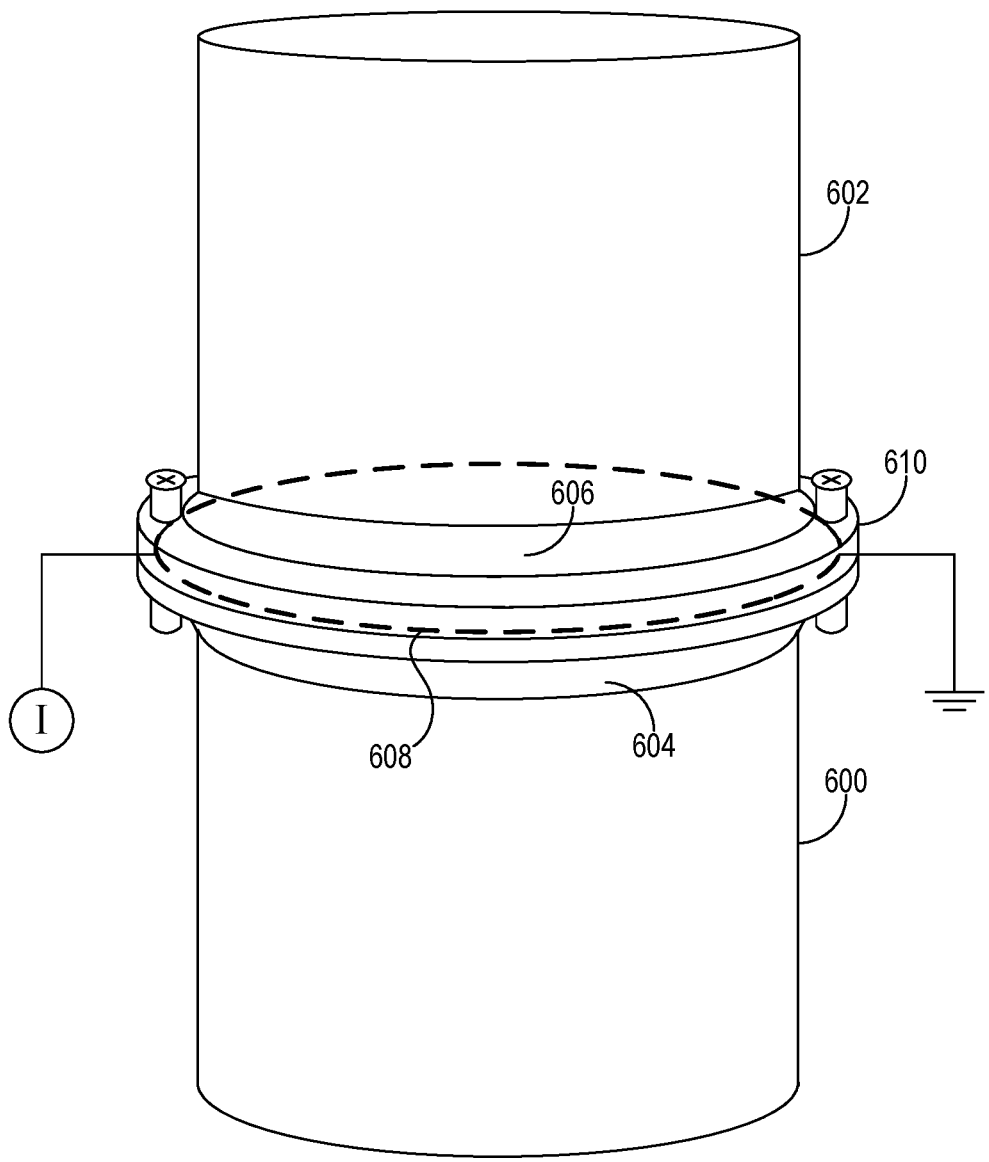
Figure 6C:
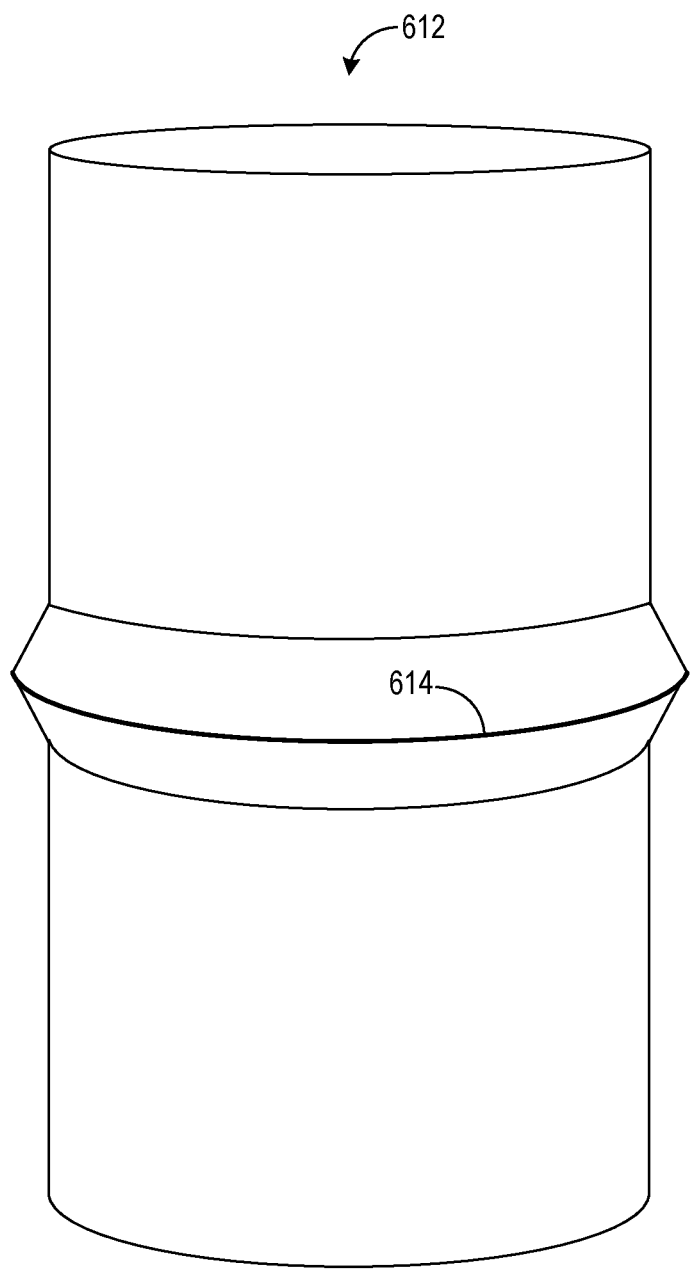

FIGS. 6A-6C depict another mechanism for holding additively manufactured portions together while welding. FIG. 6A shows a first additively manufactured metal portion 600 and a second additively manufactured metal portion 602 that respectively comprise a first flange 604 and a second flange 606. A resistive heating material 608 is arranged along an outer rim of first flange 604. First and second flanges 604 and 606 provide surfaces with which first and second portions 600 and 602 can be clamped together during welding. FIG. 6B illustrates a clamp 610 positioned to hold first and second flanges 604 and 606 together. First and second portions 600 and 602 are welded together via heat produced by directing electrical current through resistive heating material 608, thereby forming an article 612 with a welded joint 614 as shown in FIG. 6C.

Clamp 610 can be removed after forming welded joint 614, or can be left in place. In some examples, clamp 610 can be additively manufactured, and can be formed as an integral part of first and/or second portions 600 and 602 in a common additive manufacturing process. In other examples, clamp 610 can be manufactured separately from first and second portions 600 and 602. As clamp 610 can be in close proximity to the resistive heating material 608 during welding, and as first and second flanges 604 and 608 can reach high temperatures during welding, clamp 610 can be made of a material configured to withstand such temperatures without bonding to first flange 604 or second flange 606. Examples of suitable materials that can be used to form clamp 610 include but are not limited to various ceramics, such as boron nitride, alumina, silicon carbide, zirconia, $SiO_2$, silicon nitride, aluminum nitride, and/or other nitrides and oxides. Further, clamp 610 can have any suitable mechanical form, depending upon a shape of the parts being held by the clamp. As one example, clamp 610 can comprise a two-piece clamshell design having a hinge on one side and a lock on an opposing side. The use of a clamp such as clamp 610 is not limited to the flange/portion geometry depicted in FIGS. 6A-6C, nor to joints with flanges. Instead, clamp 610 can be used to hold together adjacent surfaces of any suitable parts during welding.

Figure 7:
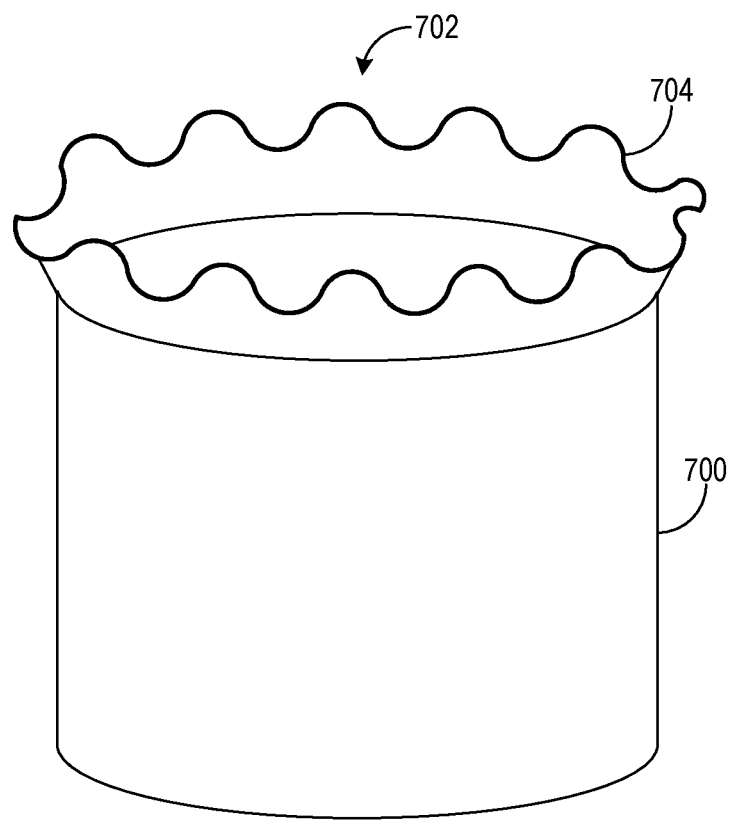
FIG. 7 shows an illustration depicting another example additively manufactured metal portion for incorporation into a larger article.

FIG. 7 depicts an example additively manufactured metal portion 700 having a flange 702 comprising an irregular profile—e.g., a sinuous, curving, and/or at least partially sinusoidal shape. Such a shape can help to resist crack propagation in a joint when portion 700 is welded to another portion. Additively manufactured metal portion 700 further includes a resistive heating material 704 provided along flange 702. Metal portion 700 can be welded to another metal portion having a geometry complementary to that of the metal portion 700. In other examples, a metal portion having an irregular interface other than a flange may be used.

Figure 8:
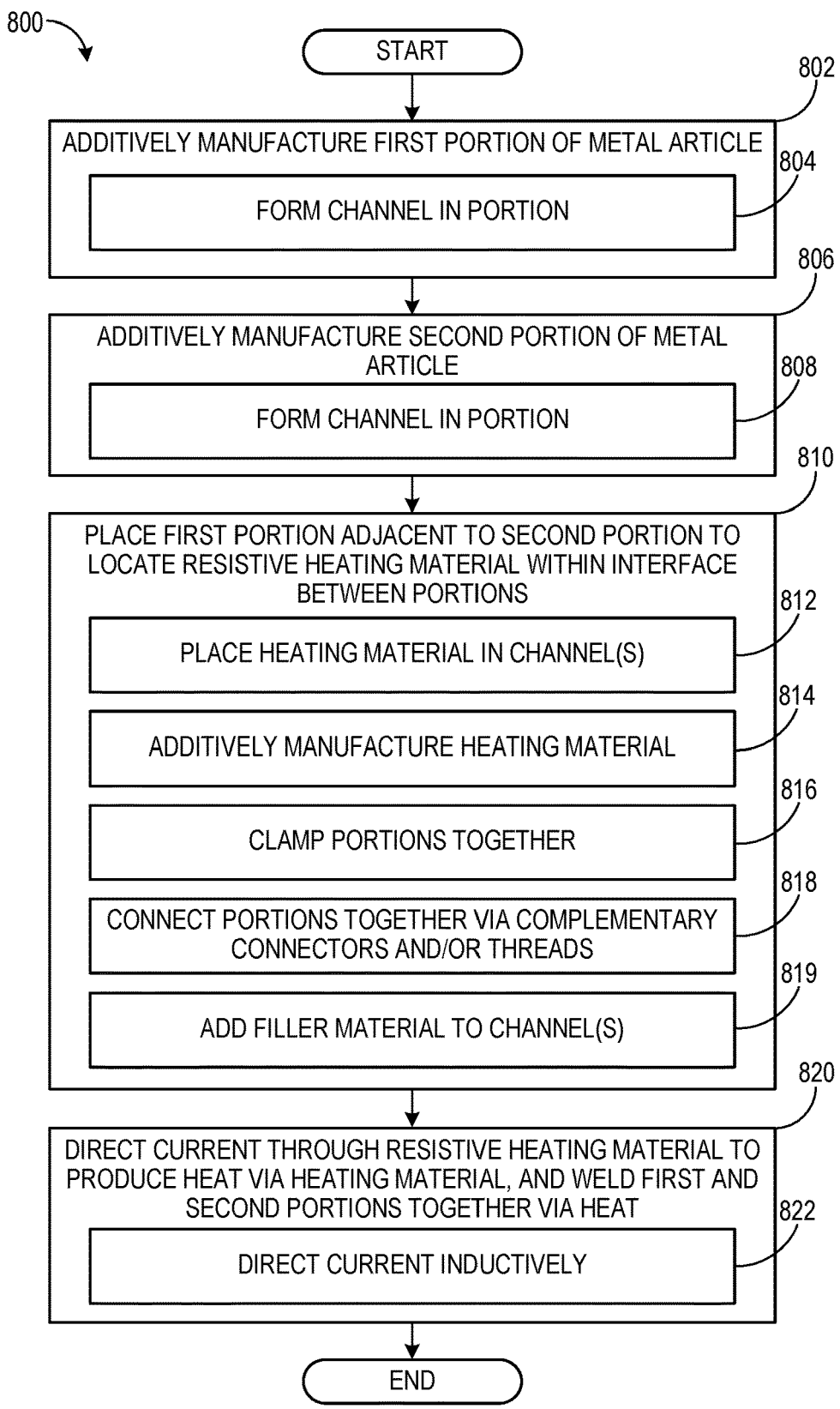
FIG. 8 shows a flow diagram depicting an example method of forming an additively manufactured metal article.

FIG. 8 shows a flowchart illustrating an example method 800 of forming a metal article. Method 800 can be employed to form any suitable article, such as a component for an aircraft or other vehicle. At 802, method 800 includes additively manufacturing a first portion of the metal article. Any suitable additively manufacturing technique(s) can be used to form the first portion, including but not limited to powder bed fusion and directed energy deposition. Additively manufacturing the first portion of the metal article can include forming 804 a channel in the first portion.

At 806, method 800 includes additively manufacturing a second portion of the metal article. Any suitable additively manufacturing technique(s) can be used to form the second portion, including but not limited to one or more of the technique(s) described above. Additively manufacturing the second portion of the metal article can include forming 808 a channel in the second portion, alternatively or in addition to forming the channel in the first portion.

At 810, method 800 includes placing the first portion of the metal article adjacent to the second portion of the metal article to locate a resistive heating material within an interface between the first portion of the metal article and the second portion of the metal article. In some examples, the resistive heating material can be placed in the channel(s) formed in the first and/or second portions, as indicated at 812. In other examples, the resistive heating material can be additively manufactured, as indicated at 814, by depositing a layer of the resistive heating material on the first portion of the metal article.

In some examples, placing the first portion of the metal article adjacent to the second portion can include clamping 816 the first and second portions together via a clamp, while in other examples a clamp can be omitted. Further, in some examples, placing the first portion of the metal article adjacent to the second portion can include connecting 818 the first portion and the second portion together via one or more of complementary connectors and threads, alternatively or additionally to using a clamp. Further, in some examples, a filler material can be added to the channel(s), as indicated at 819. The filler material can comprise a same material as the first and/or second additively manufactured metal portions, or a suitable different material that can melt or fuse to fill the channel when heated. The filler material can be provided as a powder, as a wire, as a paste or other viscous material, or in any other suitable form.

At 820, method 800 includes directing electric current through the resistive heating material to produce heat via the resistive heating material to weld the first and second portions together via heat. In some examples, directing electric current through the resistive heating material can include inductively directing 822 electric current through the resistive heating material. As those skilled in the art will understand, the amount of current applied to form the weld is based on the resistive heating material being utilized. In other examples, any other suitable current can be used.

The approaches described herein can enable the advantages of additive manufacturing to be leveraged in manufacturing large-scale parts, including but not limited to the formation of parts with complex and/or nonlinear geometries, reduced cost, reduced waste, and reduced manufacture time. Further, the described approaches can enable these advantages while avoiding challenges associated with additively manufacturing large-scale parts, such as limitations to part size due to the available manufacturing volume provided by large-scale additive manufacturing machines. In addition, the described approaches can enable the formation of parts and implementation of use cases that are infeasible via additive manufacturing alone. Challenges associated with other techniques used to form large-scale parts also can be avoided, such as tool degradation and the generation of scrap material arising from machining sheet metal. Further, the described approaches can enable the formation of parts with high quality surface finishes and reduce post-processing of formed parts. Where aircraft and/or other aerospace components are formed, the described approaches can facilitate a responsive and rapid supply chain for such components, which in turn can reduce a need to warehouse and inventory components. These advantages can aid in the construction of new aircraft and other vehicles, as well as the sustainment of existing vehicles (e.g., for aftermarket manufacturing).

Another example provides an article comprising a first additively manufactured metal portion, a second additively manufactured metal portion coupled to the first additively manufactured metal portion at a welded joint, and a resistive heating material disposed within an interior of the welded joint, the resistive heating material comprising a different material than the first additively manufactured metal portion and the second additively manufactured metal portion. In such an example, the first additively manufactured metal portion can comprise a channel, and the resistive heating material can be disposed along at least a portion of the channel. In such an example, the first additively manufactured portion alternatively or additionally can comprise threads, and the channel can be arranged between threads. In such an example, the article alternatively or additionally can comprise a filler material disposed along at least the portion of the channel. In such an example, the first additively manufactured metal portion alternatively or additionally can comprise a male connector and the second additively manufactured metal portion can comprise a female connector coupled to the male connector. In such an example, the first additively manufactured metal portion alternatively or additionally can comprise a first flange and the second additively manufactured metal portion can comprise a second flange. In such an example, the resistive heating material can comprise one or more of a wire and a film. In such an example, the article can comprise a duct, a fairing, or a panel. In such an example, the welded joint can comprise an irregular profile.

Another example provides a vehicle comprising a metal component, the metal component comprising a first additively manufactured metal portion, a second additively manufactured metal portion coupled to the first additively manufactured metal portion at a welded joint, and a resistive heating material disposed within an interior of the welded joint, the resistive heating material comprising a different material than the first additively manufactured metal portion and the second additively manufactured metal portion. In such an example, the first additively manufactured metal portion and the second additively manufactured metal portion can comprise one or more of threads, connectors, and flanges. In such an example, the vehicle can comprise an aircraft. In such an example, the metal component can comprise a fairing, a panel, or a duct.

Another example provides a method of forming a metal article, the method comprising additively manufacturing a first portion of the metal article, additively manufacturing a second portion of the metal article, placing the first portion of the metal article adjacent to the second portion of the metal article to locate a resistive heating material within an interface between the first portion of the metal article and the second portion of the metal article, directing electric current through the resistive heating material to produce heat via the resistive heating material, and welding the first portion of the metal article and the second portion of the metal article together via the heat produced via the resistive heating material. In such an example, placing the first portion of the metal article adjacent to the second portion of the metal article can comprise clamping the first portion and the second portion together via a clamp. In such an example, additively manufacturing the first portion of the metal article comprises forming a channel in the first portion of the article, and the method alternatively or additionally can comprise placing the resistive heating material in the channel. In such an example, the method alternatively or additionally can comprise adding filler material to the channel. In such an example, the method alternatively or additionally can comprise additively manufacturing the resistive heating material by depositing a layer of the resistive heating material on the first portion of the metal article. In such an example, placing the first portion of the metal article adjacent to the second portion of the metal article alternatively or additionally can comprise connecting the first portion and the second portion together via one or more of complementary connectors and threads. In such an example, directing electric current through the resistive heating material to produce heat via the resistive heating material can comprise inductively directing electric through the resistive heating material.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A method of forming a metal article, the method comprising:
   additively manufacturing a first portion of the metal article;
   additively manufacturing a second portion of the metal article;
   placing the first portion of the metal article adjacent to the second portion of the metal article to locate a resistive heating material within an interface between the first portion of the metal article and the second portion of the metal article, the resistive heating material comprising a different material than the first portion of the metal article and the second portion of the metal article;
   directing electric current through the resistive heating material to produce heat via the resistive heating material; and
   welding the first portion of the metal article and the second portion of the metal article together via the heat produced via the resistive heating material.

2. The method of claim 1, wherein placing the first portion of the metal article adjacent to the second portion of the metal article comprises clamping the first portion and the second portion together via a clamp.

3. The method of claim 1, wherein additively manufacturing the first portion of the metal article comprises forming a channel in the first portion of the article, and wherein the method further comprises placing the resistive heating material in the channel.

4. The method of claim 1, further comprising adding filler material to the channel.

5. The method of claim 1, further comprising additively manufacturing the resistive heating material by depositing a layer of the resistive heating material on the first portion of the metal article.

6. The method of claim 1, wherein placing the first portion of the metal article adjacent to the second portion of the metal article comprises connecting the first portion and the second portion together via one or more of complementary connectors and threads.

7. The method of claim 1, wherein directing electric current through the resistive heating material to produce heat via the resistive heating material comprises inductively directing electric through the resistive heating material.

* * * * *

UNITED STATES PATENT AND TRADEMARK OFFICE
CERTIFICATE OF CORRECTION

PATENT NO. : 11,179,797 B2
APPLICATION NO. : 16/845875
DATED : November 23, 2021
INVENTOR(S) : Daniel J. Braley et al.

It is certified that error appears in the above-identified patent and that said Letters Patent is hereby corrected as shown below:

In the Claims

In Column 10, Line 19, Claim 4 delete "1" and add --3--

Signed and Sealed this
Twenty-eighth Day of June, 2022

Katherine Kelly Vidal
*Director of the United States Patent and Trademark Office*